(No Model.)
W. ANDERSON.
CULTIVATING HOE FOR GRAIN DRILLS.
No. 511,183. Patented Dec. 19, 1893.
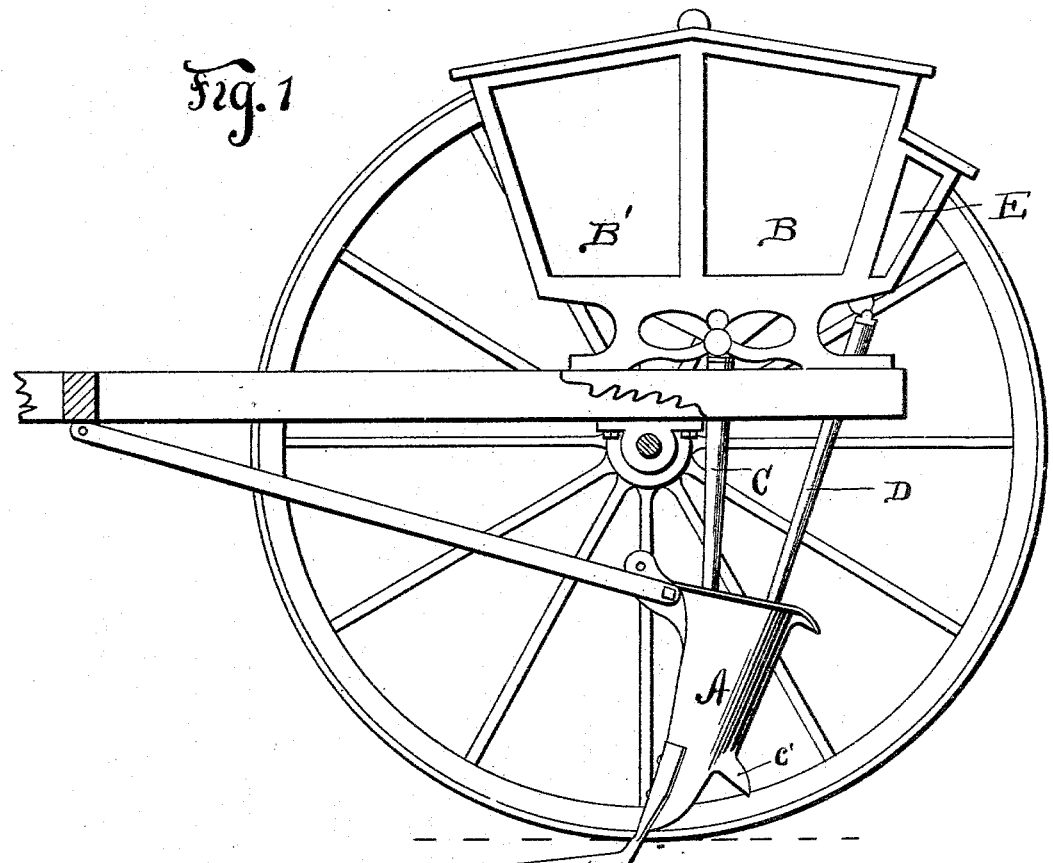
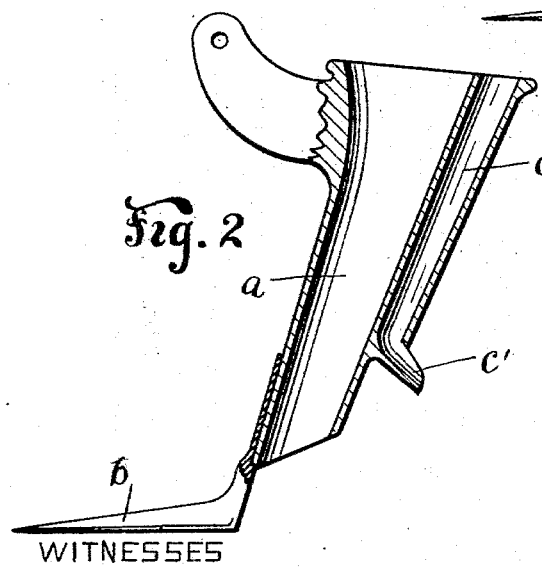
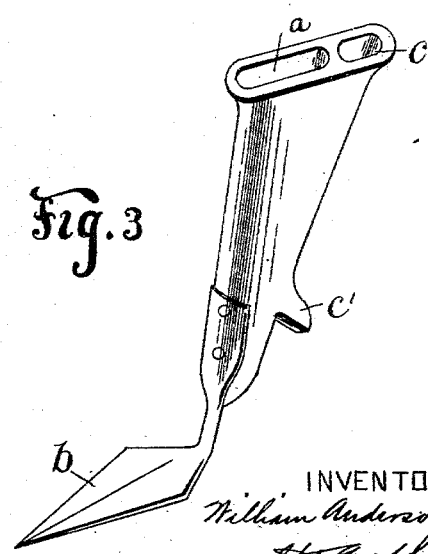
WITNESSES
Ira C. Koehne
Chas. I. Welch
INVENTOR
William Anderson
BY Staley and Shepherd
ATTORNEYS

UNITED STATES PATENT OFFICE.

WILLIAM ANDERSON, OF NEW MOOREFIELD, OHIO.

CULTIVATING-HOE FOR GRAIN-DRILLS.

SPECIFICATION forming part of Letters Patent No. 511,183, dated December 19, 1893.

Application filed August 3, 1891. Serial No. 401,442. (No model.)

*To all whom it may concern:*

Be it known that I, WILLIAM ANDERSON, a citizen of the United States, residing at New Moorefield, in the county of Clark and State of Ohio, have invented certain new and useful Improvements in Cultivating-Hoes for Grain-Drills, of which the following is a specification.

My invention relates to improvements in cultivating hoes for grain drills, and the object of my invention is to provide a device adapted to be connected to an ordinary grain-drill to adapt it for use in cultivating and fertilizing wheat or other grain, and at the same time sow grass-seed on the freshly cultivated soil after the wheat or other grain has grown above the surface of the ground.

My invention consists in the constructions and combinations of parts hereinafter described and claimed.

In the accompanying drawings, Figure 1 is a side elevation, partly in section, of my improved device shown connected to a grain-drill. Fig. 2 is a sectional view of the device in detail, and Fig. 3, a perspective view of the same.

Like parts are represented by similar letters of reference in the several views.

It is the common practice in planting wheat in soil which it is desired to fertilize, to sow the wheat and fertilizer together. Grass-seed is also frequently sown at the same time. When thus sown the wheat thus fertilized grows rapidly in the fall and early winter and being thus of a rank growth, is more easily winter killed, in which case the effect of the fertilizer is lost. If grass seed is sown at the same time that the wheat is planted with the ordinary grain-drill, the soil being plowed up and slightly furrowed by the shoes or hoes of the grain-drill, the grass-seed collects in said furrows and the loose soil, or becomes washed or blown therein so that the grass grows only in the wheat rows. It is desirable, and has been the practice to a limited extent, to cultivate wheat after the same has appeared above the ground. If at the same time the wheat is cultivated the soil should be fertilized, the fertilizer would act upon the wheat at the time it is most needed. To provide for accomplishing this result I employ a cultivating hoe A, cored out to form the ordinary channel $a$, which discharges immediately behind a diamond shaped projecting shovel $b$, which projects forward at an angle to the plane of the hoe A, and substantially parallel with the surface of the ground in operation. I also provide in the hoe A, a secondary channel $c$, separate from the channel A, and terminating in a spout $c'$, arranged considerably above the lower end of the channel $a$. The hoe thus constructed is adapted to fit on any ordinary grain-drill and take the place of the ordinary shoe or hoe thereof. The channel $a$, is connected to the fertilizer box B, by the ordinary tube C; the grain-box or hopper B', being disconnected therefrom. A secondary tube D, leads from the grass-seed hopper E, to the secondary tube $c$.

In the ordinary grain-drill the distance from the respective shoes at each side of the grain-drill to the wheel is equal to the distance between the respective shoes or hoes so that in planting, the inner wheel is caused to travel in the outside wheat row in driving across the field so that the wheat rows are formed an equal distance apart.

In operating my device the wheels are caused to travel between the respective wheat rows and thus bring the cultivating hoes midway between the intermediate wheat rows. A forward movement of the hoes breaks up the ground between the wheat rows, thus cultivating the wheat, and at the same time the fertilizer discharged from the box B, is planted in the furrow thus formed between the rows. If it is desired to plant grass-seed, it is caused to be discharged from the hopper to the secondary channel $c$, and the spout $c'$, and falls on the freshly broken soil between the wheat rows where it is retained and a perfect growth insured.

It will be understood that the device is especially adapted for use in the spring for cultivating wheat sown in the fall. It is obvious that the hoe may be used simply as a cultivator, or as a cultivator and fertilizer, or as a cultivator, fertilizer and grass-seed sower, or as a cultivator and grass-seed sower. In either case the respective operations are performed when it is most desirable and when the best results are obtained therefrom.

Having thus described my invention, I claim—

The combination with a grain-drill hoe having a channel $a$, and a projecting cultivating point $b$, of the auxiliary channel $c$, and a distributing spout $c'$, substantially as specified.

In testimony whereof I have hereunto set my hand this 30th day of July, A. D. 1891.

WILLIAM ANDERSON.

Witnesses:
PAUL A. STALEY,
CHAS. I. WELCH.